US012772135B2

(12) United States Patent
Ahmed

(10) Patent No.: US 12,772,135 B2
(45) Date of Patent: Oct. 20, 2026

(54) MANAGING SOFTWARE UPDATES TO RADIO NODES IN A WIRELESS MOBILE NETWORK

(71) Applicant: Rakuten Symphony, Inc., Tokyo (JP)

(72) Inventor: Tasnim Ahmed, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 343 days.

(21) Appl. No.: 18/644,114

(22) Filed: Apr. 24, 2024

(65) Prior Publication Data

US 2025/0338196 A1 Oct. 30, 2025

(51) Int. Cl.

| | |
|---|---|
| ***H04W 36/32*** | (2009.01) |
| ***H04W 24/08*** | (2009.01) |
| ***H04W 36/00*** | (2009.01) |
| ***H04W 36/24*** | (2009.01) |

(52) U.S. Cl.

CPC ........... *H04W 36/32* (2013.01); *H04W 24/08* (2013.01); *H04W 36/0061* (2013.01); *H04W 36/249* (2023.05)

(58) Field of Classification Search

None

See application file for complete search history.

(56) References Cited

U.S. PATENT DOCUMENTS

| | | | | |
|---|---|---|---|---|
| 9,426,677 | B2 * | 8/2016 | Sun | H04W 52/386 |
| 10,039,016 | B1 * | 7/2018 | Larish | H04W 24/02 |
| 10,638,329 | B2 * | 4/2020 | Tang | H04B 7/024 |
| 2022/0322369 | A1 * | 10/2022 | Wu | H04L 5/0053 |
| 2024/0032142 | A1 * | 1/2024 | Liu | H04L 5/0053 |
| 2024/0098509 | A1 * | 3/2024 | Indrieri | H04W 16/18 |

* cited by examiner

*Primary Examiner* — Phirin Sam

(74) *Attorney, Agent, or Firm* — HAUPTMAN HAM, LLP

(57) ABSTRACT

Radio nodes are monitored to obtain radio node coverage information and to obtain radio node status information. Based on the monitoring, coverage information and handover information for the radio nodes is collected, and transport traffic information and subscriber count information for the radio nodes are collected. Based on the radio node coverage information, node clustering is performed to identify one or more batches of source nodes to update based on a compensation capacity of neighbor nodes to the source nodes. Based on the one or more batches of source nodes identified from the node clustering, and on the radio node status information, a scheduling operation is performed to choose a time-slot for executing an update to at least one of the one or more batches of source nodes.

20 Claims, 5 Drawing Sheets

MANAGING SOFTWARE UPDATES TO RADIO NODES IN A WIRELESS MOBILE NETWORK

TECHNICAL FIELD

This description relates to a managing software updates to radio nodes in a wireless mobile network.

BACKGROUND

Cellular service providers often upgrade or update network software on base stations to introduce new service features, fix software bugs, enhance quality of experience to users, or patch security vulnerabilities. Centrally controlling networks has been shown to provide value to network operators. Firmware updates are often performed periodically or based on triggers. During a firmware update, a radio node is disconnected from a network.

A software update typically involves taking the network element out of service. Bulk firmware updates that are performed by randomly selecting radio-nodes, e.g., Virtualized Central Units (VCUs) or Open CUs, for a given area results in catastrophic scenarios. Examples of such catastrophic scenarios include coverage blackout, a steep drop in hand-over success, etc.

Thus, service providers carefully plan the network updates during off-peak time to minimize the service impact. Typically, nighttime (often referred to as maintenance windows) is used due to low traffic volumes. By executing updates sequentially (one element after another), the spare capacity of the network is able to be maximized to offload the traffic when the network element is undergoing an update.

SUMMARY

In at least one embodiment, a method includes monitoring radio nodes to obtain radio node coverage information and to obtain radio node status information, based on the radio node coverage information. Node clustering is performed to identify one or more batches of source nodes to update based on a compensation capacity of neighbor nodes to the source nodes. Based on the one or more batches of source nodes identified from the node clustering, and on the radio node status information, a scheduling operation is performed to choose a time-slot for executing an update to at least one of the one or more batches of source nodes.

In at least one embodiment, a smart scheduler is configured to monitor radio nodes to obtain radio node coverage information and to obtain radio node status information. Based on the radio node coverage information, node clustering is performed to identify one or more batches of source nodes to update based on a compensation capacity of neighbor nodes to the source nodes. Based on the one or more batches of source nodes identified from the node clustering, and on the radio node status information, a scheduling operation is performed to choose a time-slot for executing an update to at least one of the one or more batches of source nodes.

In at least one embodiment, a non-transitory computer-readable media having computer-readable instructions stored thereon, which when executed perform operations including monitoring radio nodes to obtain radio node coverage information and to obtain radio node status information. Based on the radio node coverage information, node clustering is performed to identify one or more batches of source nodes to update based on a compensation capacity of neighbor nodes to the source nodes, and based on the one or more batches of source nodes identified from the node clustering, and on the radio node status information. A scheduling operation is performed to choose a time-slot for executing an update to at least one of the one or more batches of source nodes.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

Figure 1:
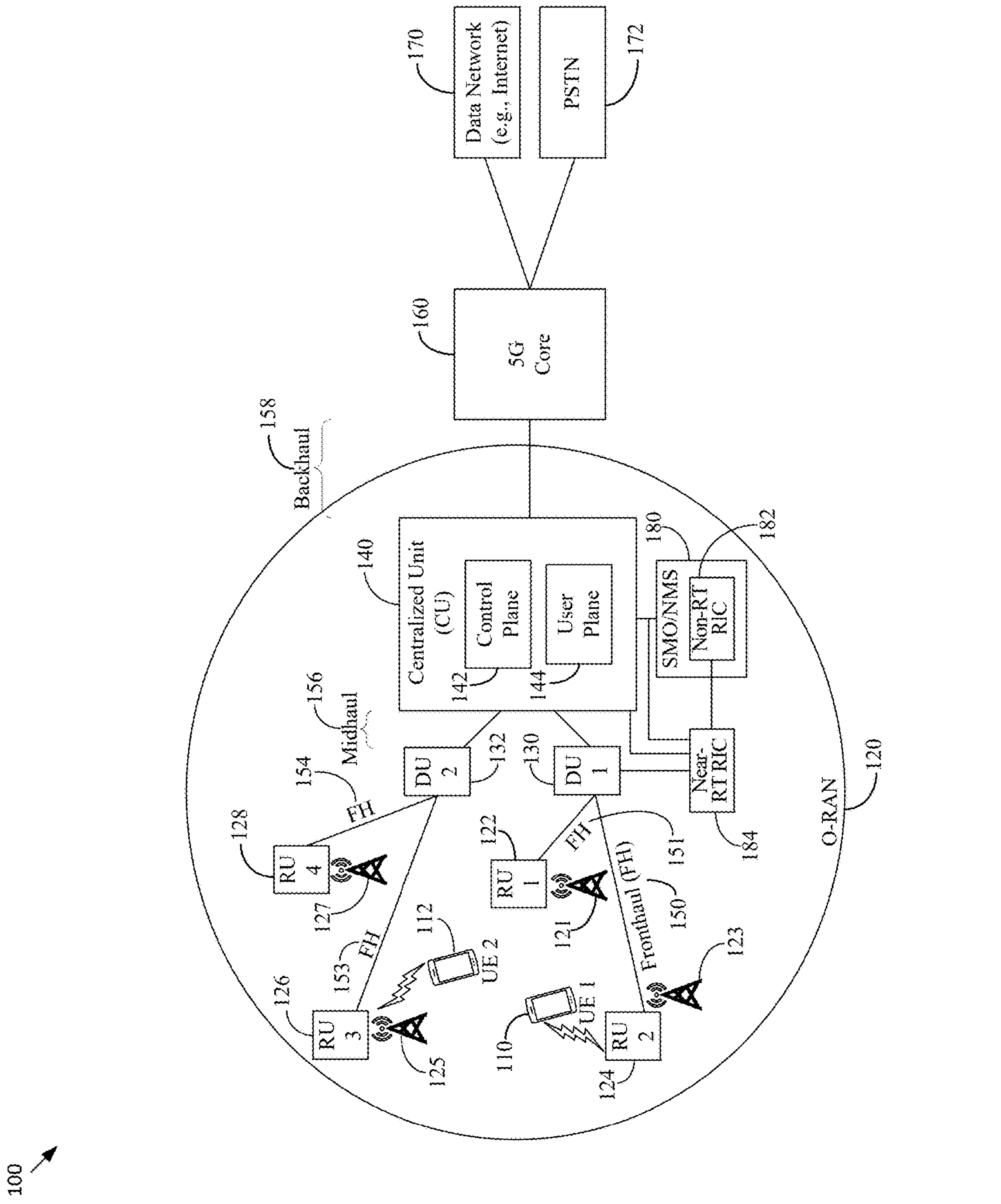
FIG. 1 illustrates a mobile network according to at least one embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

The foregoing disclosure provides illustration and description but is not intended to be exhaustive or to limit the implementations to the precise form disclosed. Modifications and variations are possible in light of the above disclosure or may be acquired from practice of the implementations.

Centrally controlling networks has been shown to provide value to network operators. Firmware updates are often performed periodically or based on triggers. During a firmware update, a radio node is disconnected from a network. Therefore, bulk firmware updates that are performed by randomly selecting radio-nodes, e.g., Virtualized Central Units (VCUs) or Open CUs, for a given area results in catastrophic scenarios. Further, sequential updates to a large network that includes thousands of radio nodes takes an excessive amount of time. Also, the ability to take into consideration the many variables involved with upgrading so many nodes is difficult. Examples of such catastrophic scenarios include coverage blackout, a steep drop in handover success, etc. Embodiments described herein implement a smart scheduler that automatically takes into consideration issues that impact network service and attempts to make a schedule of automatic software updates that are able to be executed at one time. The smart scheduler is able to keep the impact to the system and to customers significantly low or manageable.

In at least one embodiment, a method includes monitoring radio nodes to obtain radio node coverage information and to obtain radio node status information. Based on the radio node coverage information, node clustering is performed to identify one or more batches of source nodes to update based on a compensation capacity of neighbor nodes to the source nodes. Based on the one or more batches of source nodes identified from the node clustering, and on the radio node status information, a scheduling operation is performed to choose a time-slot for executing an update to at least one of the one or more batches of source nodes.

Embodiments described herein provide a method that provides one or more advantages. For example, Smart Scheduler 530 (FIG. 5) is able to reduce the impact to network coverage area during updates to source nodes by, for example, utilizing the neighboring nodes, maintaining handover success rates among radio-nodes, e.g., handover success rates close to a pre-schedule period, minimizing a reduction of IP network traffic by shutting down nodes at the optimal time when the throughput is minimum, updating nodes while the least number of users are connected, and ensuring adequate coverage and handover support for the high priority nodes, e.g., nodes that VIPs or many subscribers are connected. Smart Scheduler 530 also automatically takes into consideration issues that impact network service and attempts to make a schedule of automatic software updates that are able to be executed at one time. Smart Scheduler 530 is able to keep the impact to the system and to customers significantly low or manageable. Node network coverage area affected is minimized and the handover success rate among the radio nodes is maintained, the reduction of IP network traffic is minimized by updating nodes while the least number of users are connected.

FIG. 1 illustrates a mobile network 100 according to at least one embodiment.

In FIG. 1, UE 1 (User Equipment 1) 110 and UE 2 112 access Mobile Network 100 via a Radio Access Network 120.

Radio Access Network 120 includes Radio Towers 121, 123, 125, and 127. Radio Towers 121, 123, 125, 127 are associated with RU (Radio Unit) 1 122, RU 2 124, RU 3 126, and RU 4 128, respectively.

RU 1 122, RU 2 124, RU 3 126, RU 4 128 handle the Digital Front End (DFE) and the parts of the PHY layer, as well as the digital beamforming functionality. RU 1 122 and RU 2 124 are associated with Distributed Unit (DU) 1 130, and RU 3 126 and RU 4 128 are associated with DU 2 132. DU 1 130 and DU 2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data is moves across the physical network.

DU 1 130 is coupled to the RU 1 122 and RU 2 124, and DU 2 132 is coupled to RU 3 126 and RU 4 128. DU 1 130 and DU 2 132 run the RLC, MAC, and parts of the PHY layer. DU 1 130 and DU 2 132 include a subset of the eNB/gNB functions, depending on the functional split option, and operation of DU 1 130 and DU 2 132 are controlled by Centralized Unit (CU) 140. CU 140 is responsible for non-real time, higher L2 and L3. Server and relevant software for CU 140 is able to be hosted at a site or is able to be hosted in an edge cloud (datacenter or central office) depending on transport availability and the interface for the Fronthaul connections 150, 151, 153, 154. The server and relevant software of CU 140 is also able to be co-located at DU 1 130 or DU 2 132, or is able to be hosted in a regional cloud data center.

CU 140 handles the RRC and PDCP layers. The gNB includes CU 140 and one or more DUs, e.g., DU 1 130, connected to CU 140 via Fs-C and Fs-U interfaces for a Control Plane (CP) 142 and User Plane (UP) 144, respectively. CU 140 with multiple DUs, e.g., DU 1 130, and DU 2 132, support multiple gNBs. The split architecture enables a 5G network to utilize different distribution of protocol stacks between CU 140, and DU 1 130 and DU 2 132, depending on network design and availability of the Midhaul 156. While two connections are shown between CU 140 and DU 1 130 and DU 2 132, CU 140 is able to implement additional connections to other DUs. CU 150, in 5G, is able to implement, for example, 256 endpoints or DUs. CU 140 supports the gNB functions such as transfer of user data, mobility control, RAN sharing (MORAN), positioning, session management, etc. However, one or more functions are able to be allocated to the DU. CU 140 controls the operation of DU 130 and DU 132 over the Midhaul interface 156.

Backhaul 158 connects the 4G/5G Core 160 to the CU 140. Core 160 may be, for example, up to 200 km away from the CU 140. Core 160 provides access to voice and data networks, such as Internet 170 and Public Switched Telephone Network (PSTN) 172.

RAN 120 is able to implement beamforming that allows for directional transmission or reception. 5G beamforming enables 5G connections to be more focused toward a receiving device. RAN 120 is also able to implement MIMO (Multiple Input Multiple Output), including mMIMO (massive MIMO), to provide an increases in throughput and signal-to-noise ratio (SNR). MIMO improves the radio link by using the multiple paths over which signals travel from the transmitter to the receiver. The multiple paths are decorrelated and this provides the opportunity to send multiple data streams over them.

Massive MIMO and dense small cell deployments are being implemented to improve radio resource efficiency. However, the intra-cell interference from neighboring cells presents a serious problem. According to at least one embodiment, the modeling of interference patterns in a Massive MIMO deployment is used to identify interfering beams between different sectors so that interference optimization techniques are able to be applied to address interference.

According to at least one embodiment, a northbound platform for the network is provided, such as a Service Management and Orchestration (SMO)/NMS 180. SMO 180 oversees he orchestration aspects, and the management and automation of RAN elements. SMO 180 supports O1, A1 and O2 interfaces. Non-RT RIC (non-Real-Time RAN Intelligent Controller) 182 enables non-real-time control and optimization of RAN elements and resources, AI/ML workflow including model training and updates, and policy-based guidance of applications/features in Near-RT RIC 184. Near-RT RIC 184 enables near-real-time control and optimization of O-RAN elements and resources via fine-grained data collection and actions over the E2 interface. Near-RT RIC 184 includes interpretation and enforcement of policies from Non-RT RIC 182, and supports enrichment information to optimize control function.

Near-RT RIC 184 obtains information associated with the beams that are passed to non-RT RIC 182 and processed, for example, by an rApp at the Non-RT RIC 182, to generate an interference matrix. xApps are hosted on the Near-RT RIC 184 and are able to be used to optimize radio spectrum efficiency. rApps are specialized microservices operating on the Non-RT RIC 182. xApps and rApps provide control and management features and functionality.

AI-Based Network Management is able to be provided at the 5G Edge via the rApps in the Non-RT RIC 182. Data is collected by a Node, such as an O-CU 140. Collected Data is processed. The ML Model at the Non-RT RIC 182 is Trained/Optimized using the processed data from the database. By implementing AI-Based Network Management at the 5G EDGE, performance is adjusted through continuous learning, and failures are handled by model monitoring.

While an O-RAN 120 is shown in FIG. 1, embodiments described herein are applicable to O-RANs and Virtualized RANs (vRANs). O-RAN and vRAN disaggregate RAN hardware into three modules or functions, e.g., Radio Units (RUs) 122, 124, 126, 128, Distributed Units (DUs) 130, 132, and Centralized Units (CUs) 140. The software for these functions is decoupled from the purpose-built hardware and run on standardized, common off-the-shelf (COTS) hardware. O-RAN 120 further opens the software interfaces between radios and other network elements, whereas the interfaces between components in vRAN are still primarily based on closed or proprietary interfaces. A RAN Intelligent Controller (RIC) including Non-RT RIC 182 and RT RIC 184, is also able to be integrated with Multi-Access Edge Cloud (MEC) and vRAN. Herein, Radio Nodes refers to RUs 122, 124, 126, 128, Dus 130, 132, and CUs 140. A Smart Scheduler as described below is able to be implemented at SMO 180.

Figure 2:
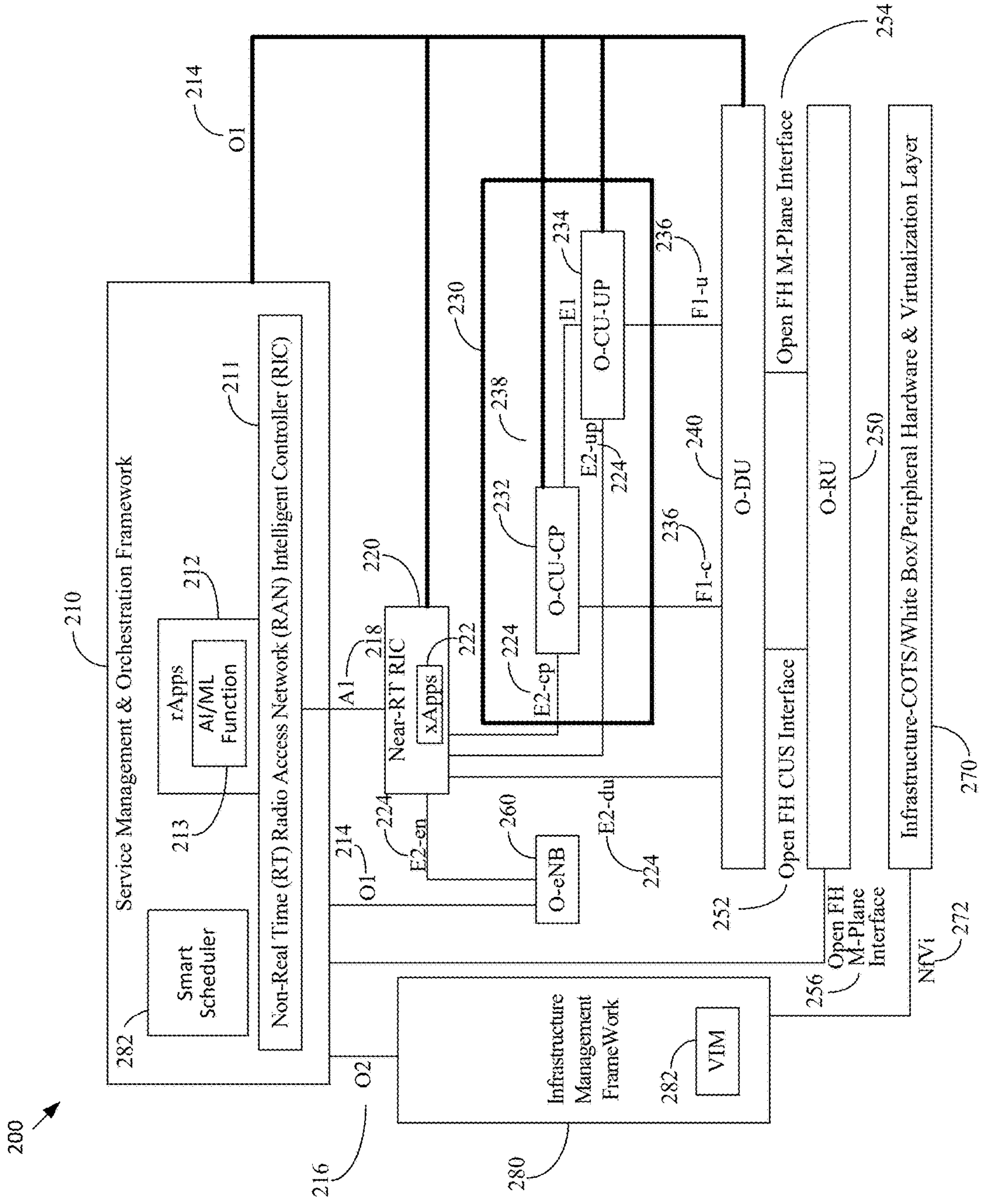
FIG. 2 is a block diagram of an Open Radio Access Network (O-RAN) according to at least one embodiment.

FIG. 2 is a block diagram of an Open Radio Access Network (O-RAN) 200 according to at least one embodiment.

In FIG. 2, Service Management and Orchestration (SMO) Framework 210 is an automation platform for Open RAN Radio Resources. SMO 210 oversees lifecycle management of network functions as well as O-Cloud. SMO 210 includes a Non-Real-Time (RT) Radio Access Network (RAN) Intelligent Controller (RIC) 211. SMO 210 also defines various SMO interfaces, such as the O1 214, O2 216, and A1 218 interfaces.

The A1 interface 218 enables communication between the Non-RT RIC 211 and a Near-RT RIC 220 and supports policy management, data transfer, and machine learning management. The A1 interface 218 is also used for policy guidance. SMO 210 provides fine-grained policy guidance such as getting User-Equipment to change frequency, and other data enrichments to RAN functions over the A1 interface 218.

The O1 214 interface connects the SMO 210 to the RAN managed elements, which include the Near-RT RIC 220, O-RAN Centralized Unit (O-CU) 230, O-RAN Distributed Unit (O-DU) 240, and the Open Evolved NodeB (O-eNB) 260. The management and orchestration functions are received by the managed elements via the O1 interface 214. The SMO 210 in turn receives data from the managed elements via the O1 interface 214 for AI model training at the Non-RT RIC 211. The O1 interface 214 is further used for managing the operation and maintenance (OAM) of multi-vendor Open RAN functions including fault, configuration, accounting, performance and security management, software management, and file management capabilities.

The O2 interface 216 is used to support cloud infrastructure management and deployment operations with O-Cloud infrastructure that hosts the Open RAN functions in the network. The O2 interface 216 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 210 provides a common data collection platform for management of RAN data as well as mediation for the O1 214, O2 216, and A1 218 interfaces. Licensing, access control and AI/ML lifecycle management are supported by the SMO 210, together with legacy north-bound interfaces. SMO 210 also supports existing OSS functions, such as service orchestration, inventory, topology and policy control.

The Non-RT RIC 211 enables non-real-time (>1 second) control of RAN elements and their resources through cloud-native microservice-based applications, which are referred to as rApps 212. An rApp 212 is able to implement an AI/ML Function 213. Non-RT RIC 211 communicates with applications called xApps 222 running on a Near-RT RIC 211 to provide policy-based guidance for edge control of RAN elements and their resources. The Non-RT RIC 211 provides non-real-time control and optimization of RAN elements and resources, AI/ML workflow, including model training of the AI/ML Function 213, updates, and policy-based guidance of applications/features in Near-RT RIC 220.

Near-RT RIC 220 controls RAN infrastructure at the cloud edge. Near-RT RIC 220 controls RAN elements and their resources with optimization actions that typically take 10 milliseconds to one second to complete. The Near-RT RIC 220 receives policy guidance from the Non-RT RIC 211 and provides policy feedback to the Non-RT RIC 211 through the xApps 222.

The xApps 222 are used to enhance the RAN's spectrum efficiency. The Near-RT RIC 220 manages a distributed collection of "southbound" RAN functions, and also provides "northbound" interfaces for operators: the O1 214 and A1 218 interfaces to the Non-RT RIC 211 for the management and optimization of the RAN. The Near-RT RIC 220 is thus able to self-optimize across different RAN types, like macros, Massive MIMO and small cells, maximizing network resource utilization for 5G network scaling.

Within the Near-RT RIC 220, the xApps 222 communicate via defined interface channels. An internal messaging infrastructure provides the framework to handle conflict mitigation, subscription management, app lifecycle management functions, and security. Data transfers are implemented via the E2 interface.

The O-RAN is split into a Central Unit (CU) 230, a Distributed Unit (DU) 240, and a Radio Unit (RU) 250. The CU 230 is further split into two logical components, one for the Control Plane (CP) 232, and one for the User Plane (UP) 234. The logical split of the CU 230 into the CP 232 and UP 234 allows different functionalities to be deployed at different locations of the network, as well as on different hardware platforms. For example, CUs 230 and DUs 240 can be virtualized on white box servers at the edge, while the RUs 250 are implemented on Field Programmable Gate Arrays (FPGAs) and Application-specific Integrated Circuits (ASICs) boards and deployed close to RF antennas.

The O-RAN Distributed Unit (O-DU) 240 is an edge server that includes baseband processing and radio frequency (RF) functions. The O-DU 240 hosts radio link control (RLC), MAC, and a physical layer with network function virtualization or containers. O-DU 240 supports one or more cells, and the O-DUs are able to support one or more beams to provide the operating support for O-RU 250 by CUS (Control, User, and Synchronization) planes 252, and management (M) planes 254 through front-haul interfaces.

The O-RU 250 processes radio frequencies received by the physical layer of the network. The processed radio frequencies are sent to the O-DU 240 through fronthaul interfaces 252, 254. The O-RU 250 hosts the lower PHY Layer Baseband Processing and RF Front End (RF FE), and is designed to support multiple 3GPP split options.

An Open-Evolved Node B (O-eNB) 260 provides the hardware aspect of the O-RAN. The management and orchestration functions are received by the managed elements via the O1 interface 214. The SMO 210 in turn receives data from the managed elements via the O1 interface 214 for AI model training of AI/ML Functions 213 implemented by rApps 213 at Non-RT RIC 211. The O-eNB 260 communicates with the Near-RT RIC 220 via the E2 interface 224. E2 224 enables near-real-time loops through the streaming of telemetry from the RAN and the feedback with control from the Near-RT RIC 220. The E2 interface 224 connects the Near-RT RIC 220 with an E2 node, such as the O-CU-CP 232, O-CU-UP 234, the O-DU 240, and the O-eNB 260. An E2 node is connected to one Near-RT RIC 220, while a Near-RT RIC is able to be connected to multiple E2 nodes. The protocols over the E2 interface 224 are based on the control plane and supports services and functions of Near-RT RIC 220.

An F1 Interface 236 connects the O-CU-CP 232 and the O-CU-UP 234 to the O-DU 240. Thus, the F1 interface 236 is broken into control and user plane subtypes and exchanges data about the frequency resource sharing and other network statuses. One O-CU 230 can communicate with multiple O-DUs 240 via F1 interfaces 236.

An E1 238 interface connects the O-CU-CP 232 and the O-CU-UP 234. The E1 Interface 238 is used to transfer configuration data and capacity information between the O-CU-CP 232 and the O-CU-UP 234. The configuration data ensures the O-CU-CP 232 and the O-CU-UP 234 are able to interoperate. The capacity information is sent from the O-CU-UP 234 to the O-CU-CP 232 and includes the status of the O-CU-UP 234.

The O-DU 240 communicates with the O-RU 250 via an Open Fronthaul (FH) Control, User, and Synchronization (CUS) Plane Interface 252 and an M-Plane (Management Plane) Interface 254. As part of the CUS Plane Interface 252, the C-Plane (control plane) is a frame format that carries data in real-time control messages between the O-DU 240 and O-RU 250 for use to control user data scheduling, beamforming weight selection, numerology selection, etc. Control messages are sent separately for downlink (DL)-related commands and uplink (UL)-related commands.

The U-Plane carries the user data messages between the O-DU 240 and O-RU 250, such as the in-phase and quadrature-phase (IQ) sample sequence of the orthogonal frequency division multiplexing (OFDM) signal. The S-plane includes synchronization messages used for timing synchronization between O-DU 240 and O-RU 250. The Control and User Plane are also used to send information specifying beamforming weights from the O-DU 240 to O-RU 250. Other information includes time resource and frequency resource information.

The M-Plane 254 connects the O-RU 250 to the O-DU 240, and an optional M-Plane 256 connects the O-RU 250 to the SMO 210. The O-DU 240 uses the M-Plane 254 to manage the O-RU 250, while the SMO 210 is able to provide FCAPS (Fault, Configuration, Accounting, Performance, Security) services to the O-RU 250. The M-plane 254 supports the management features including startup installation, software management, configuration management, performance management, fault management and file management.

The M-Plane 254 is used by the O-DU 240 to retrieve the capabilities of the O-RU 250 and to send relevant configuration related to the C-Plane and U-Plane (data plane) to the O-RU 250. Together the 01 214 and Open-Fronthaul M-plane 254 interfaces provide a FCAPS interface with configuration, reconfiguration, registration, security, performance, monitoring aspects exchange with individual nodes, such as O-CU-CP 232, O-CU-UP 234, O-DU 240, and O-RU 250, as well as Non-RT RIC 220.

Infrastructure-COTS/White Box/Peripheral Hardware & Virtualization Layer 270 connects to Infrastructure Management Framework 280 via Network Function Virtualization Interface (NFVI) 272. Virtualized Infrastructure Manager (VIM) 282 at Infrastructure Management Framework 280 controls and manages virtual network functions.

According to at least one embodiment, a Smart Scheduler 282 is able to be implemented at SMO 210. Smart Scheduler 282 prepares for automatic bulk/batchwise radio-node software/firmware updates and other maintenance activities. Smart Scheduler 282 provides automatic bulk/batchwise scheduling of software update for radio nodes. Smart Scheduler 282 automatically takes into consideration issues that impact network service and attempts to make a schedule of automatic software updates that are able to be executed at one time. Smart Scheduler 282 is able to keep the impact to the system and to customers significantly low or manageable.

Figure 3:
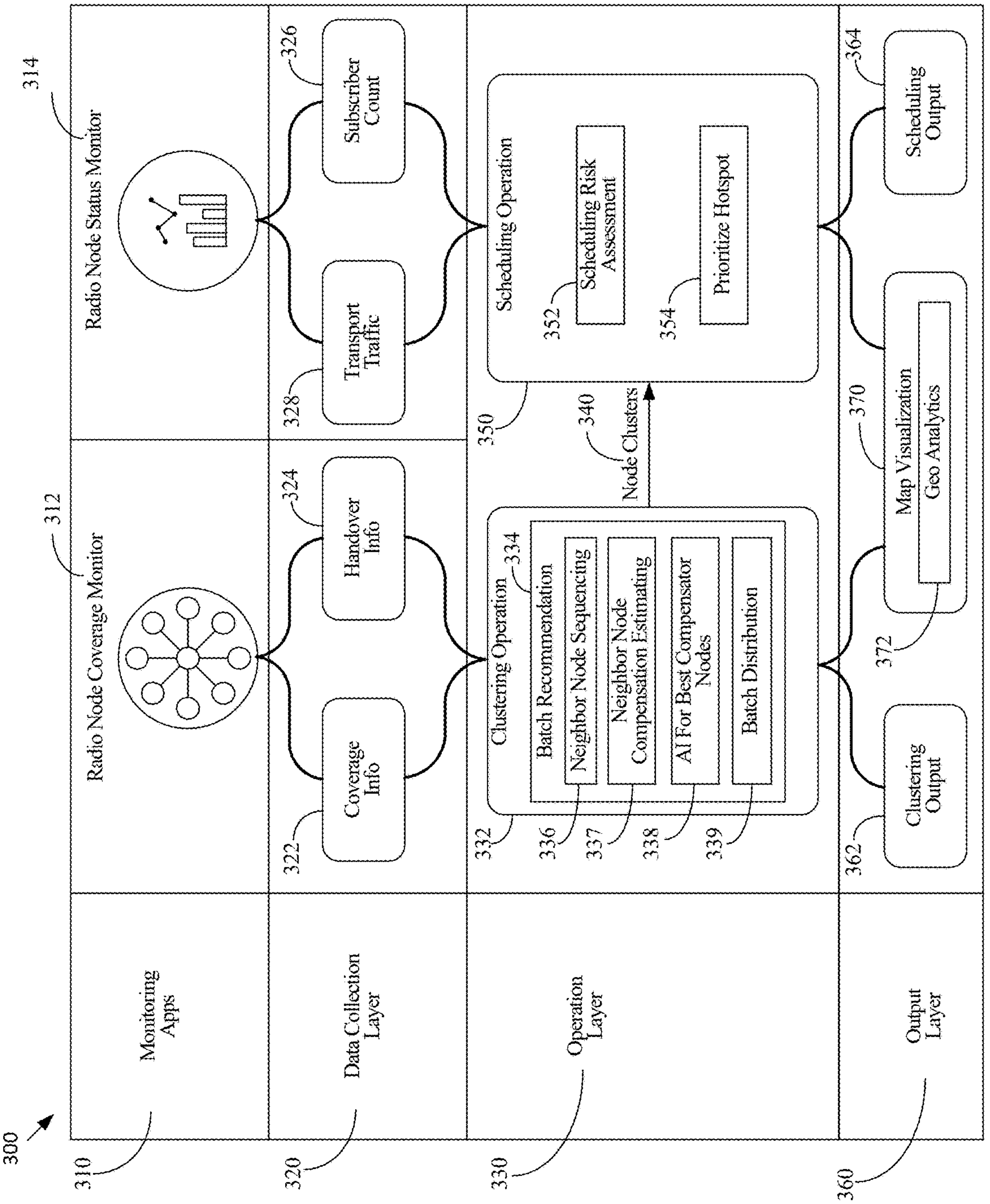
FIG. 3 illustrates the operational overview of a Smart Scheduler according to at least one embodiment.

FIG. 3 illustrates the operational overview of a Smart Scheduler 300 according to at least one embodiment.

In FIG. 3, Smart Scheduler 300 provides automatic bulk/batchwise scheduling of software update for radio nodes by running Monitoring Apps 310 that provide a Radio Node Coverage Monitor 312 and a Radio Node Status Monitor 314. Smart Scheduler 300 is thus able to monitor radio nodes for radio node coverage information and for radio node status information. Based on the radio node coverage information, at a Data Collection Layer 320 information is collected from the Radio Node Coverage Monitor 312, such as the Coverage Information 322 and Handover Information 324. The Radio Node Status Monitor 314 obtains connected Subscriber Count 326 and Transport Traffic Statistics 328 based on the monitoring of radio node status information.

At an Operation Layer 330, Clustering Operation 332 processes the collected Coverage Information 322 and Handover Information 324 to perform node clustering. Clustering Operation 332 handles the clustering of Source Nodes in a particular area in a way that each batch for an update is able to be shut down at once without causing a significant impact, such as causing a coverage area blackout or other service issue. Clustering Operation 332 identifies batches of source nodes to update and clusters together the safest Source Nodes that are able to be shut down in a batch. Clustering Operation 332 includes Batch Recommendation 334 that identifies Batches of Source Nodes to update based on a compensation capacity of neighbor nodes of the Source Nodes. Clustering Operation 332 determines the source nodes, identifies the neighbor nodes to the source node, and sequences the neighbor nodes according to a combined coverage capacity clustered by Coverage, Handover Success (HOS) Ratio, and HO Attempts. Neighbor Node Sequencing 336 prioritizes gain in collective coverage. Neighbor Sequencing 336 is used to sequence or sort Neighbor Nodes according to a combined coverage capacity. Net collective coverage ratio, average handover success rate, and total handover attempt ratio are determined. Clustering Operation 332 also prioritizes hotspots to determine a scheduled time-slot having a lowest traffic and to determine an additional coverage backup for the source nodes associated with the prioritized hotspots.

Neighbor Node Compensation Estimation 337 is performed using the net collective coverage ratio, average handover success rate, and total handover attempt ratio. Neighbor Node Compensation Estimation 337 is based on weighted average of the net collective coverage ratio, average handover success rate, and total handover attempt ratio, wherein the is weighted at 70%, the average handover success rate is weighted at 20%, and the handover attempt ratio is weighted at 10%. A compensation risk is determined based on the collective neighbor compensation.

Smart Scheduler 300 uses Artificial Intelligence (AI) 338 to reduce the impact on Network coverage, hand-over success, IP network traffic, and connected subscribers. For example, AI 338 is used for sequencing Neighbor Nodes for choosing the best compensator node. In response to one node shutting down, compensating Neighbor Nodes that are close and that are the most capable of minimizing that shutdown are identified. AI 338 ranks the Neighbor Nodes in terms of their compensating capacity. Clustering Operation 332 applies agglomerative hierarchical-clustering based on an unsupervised machine learning to select compensating Neighbor Nodes to compensate Source Nodes during the firmware update of the Sources Nodes to provide maximum coverage and handover.

Batch Distribution 339 is performed to identify a Batch of Source Nodes for updating the firmware based on the compensation risk. Node Clusters 340 is provided to Scheduling Operation 350.

Scheduling Operation 350 determines a schedule for upgrading Source Node clusters that provides a minimal impact on data traffic and connected subscribers. The Smart Scheduler 300 performs Scheduling Operation 350 using AI to calculate a scheduling duration by forecasting traffic volume and a subscriber count for source nodes based on historical time series data. Scheduling Operation 350 prioritizes the traffic and subscriber count for individual clusters so the scheduler is able to rank time-slots for the one or more batches based on a forecast traffic volume and subscriber count for the source nodes in the one or more batches in order to assign the best time-slot to a particular cluster or batch. The one or more batches are ranked according to a priority based on the hotspot count. Time-slots that are compatible for the one or more batches are filtered based on a batch schedule criteria. The Scheduling Operation 350 of Smart Scheduler 300 then selects a highest priority compatible time-slot having a least number of allocated batches, and assigns the selected highest priority compatible time-slot to a highest ranked batch of the one or more batches. In selecting a batch to assign to the time-slot, Scheduling Operation 350 of Smart Scheduler 300 also performs a Scheduling Risk Assessment 352 to identify the at least one of the one or more batches of source nodes to shut down having a minimal impact on data traffic and connected subscribers based on, for example, performance metrics. Prioritizing of Hotspots 354 is used to determine a scheduled time-slot having a lowest traffic and to provide additional coverage for the prioritized source nodes.

Clustering Operation 330 produces at Output Layer 360 Clustering Output 362, and Scheduling Output 364 is produced by the Scheduling Operation 350. Map Visualization 370 is produced by Clustering Operation 330 and Scheduling Operation 350. Geo Analytics 372 produces geographic maps to determine maximum collective coverage. Geographic map produced by Geo Analytics 372 is checked for a Source Node coverage area to determine the collective coverage capacity of multiple Neighbor Nodes to compensate for a particular Source Node. Geographic map produced by Geo Analytics 372 provides performance statistics and map visualization associated with node device performance, batchwise performance, and overall performance.

During software updates or maintenance activity for Source Nodes inside an area, e.g., 1000 VCUs, O-CUs, or other telecom devices inside an area, field engineers manually shut down one or two devices inside a small area and do not switch off the other Source Nodes close to those ones so that there is no significant impact on the consumers, e.g., no coverage blackout inside that area. Currently there is no automatic system that takes care of all the issues that are to be taken into consideration. For example, knowledge to take into consideration includes knowing the coverage area that is affected in response to a network operator shutting down a node. Other issues to take into consideration include knowing what percentage of the coverage area is not available, whether handovers to nearby node are able to continue, is the IP traffic for the affected area or the uplink and downlink data traffic of the area able to be handled by the current remaining nodes inside that area, are devices close to the affected nodes not able to be handed over to other nodes, what are the number of nodes affected and what is the portion of the area that is affected.

Smart Scheduler 300 automatically takes into consideration these and other issues that impact network service and attempts to make a schedule of automatic software updates that are able to be executed at one time, in a Batch. At any instance, there is to be a balance. While affecting some consumers is acceptable, large scale impact to consumers is to be avoided. Smart Scheduler 300 is able to keep the impact to the system and to customers significantly low or manageable. Node network coverage area affected is minimized and the handover success rate among the radio nodes is maintained, the reduction of IP network traffic is minimized by updating nodes while the least number of users are connected. A time-slot during the day is able to be selected where the least number of users are connected and adequate coverage is ensured. Handover support for high priority nodes is also ensured. For example, in response to the updated node involving a crowed public place or there are VIPs at the location, e.g., hotspots. More emphasis is to be given to those nodes so that impact to consumers in a crowded public place or VIP customers is minimal.

Thus, according to at least one embodiment a smart scheduler automatically takes into consideration issues that impact network service and attempts to make a schedule of automatic software updates that are able to be executed at one time. The smart scheduler is able to keep the impact to the system and to customers significantly low or manageable. Scheduling updates to nodes in a network includes monitoring radio nodes to obtain radio node coverage information and to obtain radio node status information. Based on the radio node coverage information, node clustering is performed to identify one or more batches of source nodes to update based on a compensation capacity of neighbor nodes to the source nodes. Based on the one or more batches of source nodes identified from the node clustering, and on the radio node status information, a scheduling operation is performed to choose a time-slot for executing an update to at least one of the one or more batches of source nodes.

Figure 4:
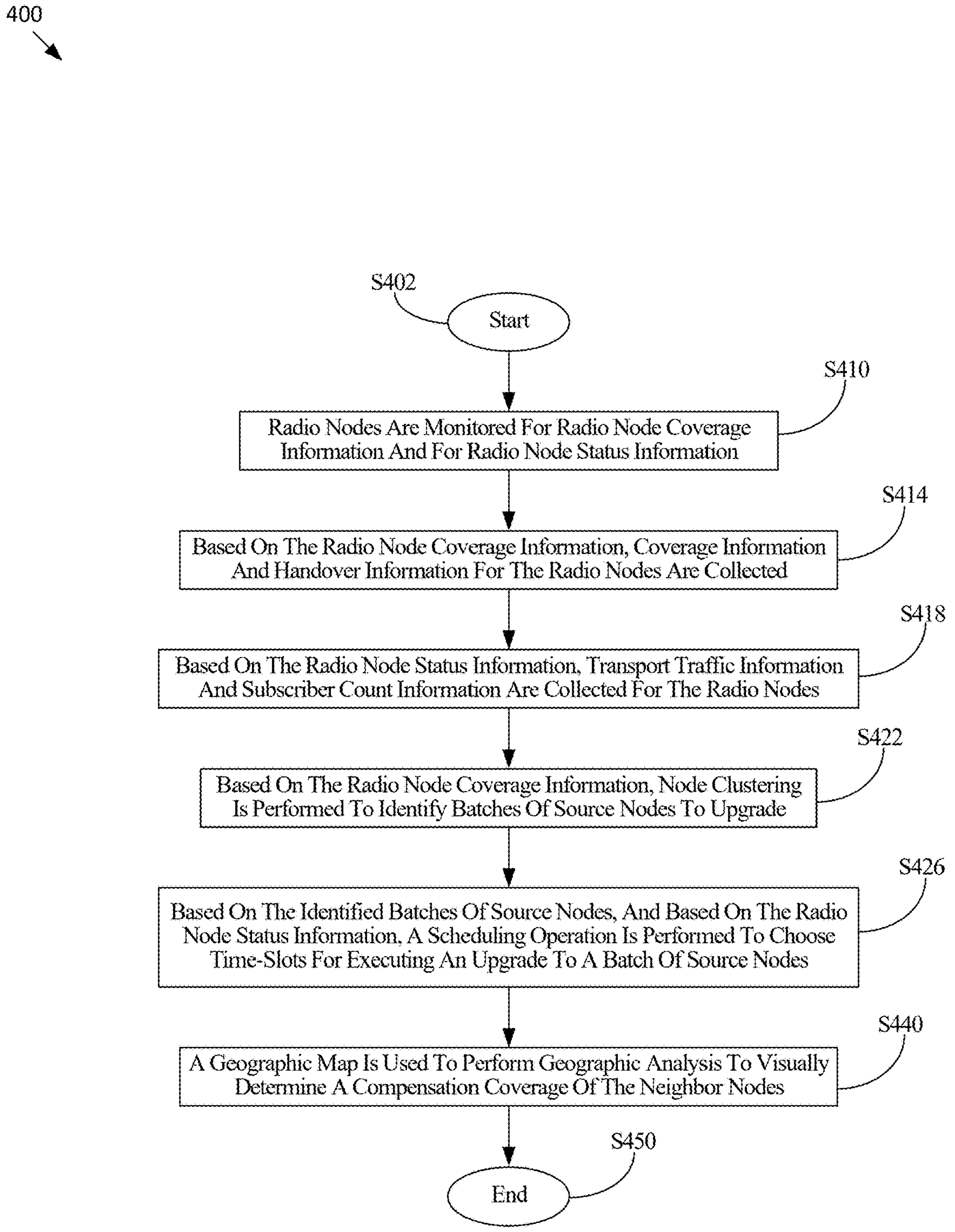
FIG. 4 is a flowchart of a method for providing smart scheduling to manage software updates to radio nodes in a wireless mobile network according to at least one embodiment.

FIG. 4 is a flowchart 400 of a method for providing smart scheduling to manage software updates to radio nodes in a wireless mobile network according to at least one embodiment.

In FIG. 4, the process starts S402 and radio nodes are monitored for radio node coverage information and for radio node status information S410. Referring to FIG. 3, Smart Scheduler 300 provides automatic bulk/batchwise scheduling of software update for radio nodes by running Monitoring Apps 310 that provide a Radio Node Coverage Monitor 312 and a Radio Node Status Monitor 314. Smart Scheduler 300 is thus able to monitor radio nodes for radio node coverage information and for radio node status information.

Based on the radio node coverage information, coverage information and handover information for the radio nodes are collected S414. Referring to FIG. 3, based on the radio node coverage information, at a Data Collection Layer 320 information is collected from the Radio Node Coverage Monitor 312, such as the Coverage Information 322 and Handover Information 324.

Based on the radio node status information, transport traffic information and subscriber count information are collected for the radio nodes S418. Referring to FIG. 3, the Radio Node Status Monitor 314 obtains connected Subscriber Count 326 and Transport Traffic Statistics 328 based on the monitoring of radio node status information.

Based on the radio node coverage information, node clustering is performed to identify batches of source nodes to update S422. Referring to FIG. 3, at an Operation Layer 330, Clustering Operation 332 processes the collected Coverage Information 322 and Handover Information 324 to perform node clustering. Clustering Operation 332 handles the clustering of Source Nodes in a particular area in a way that a batch for an update is able to be shut down at once without causing a significant impact, such as causing a coverage area blackout or other service issue. Clustering Operation 332 identifies batches of source nodes to update and clusters together the safest Source Nodes that are able to be shut down in a batch. Clustering Operation 332 includes Batch Recommendation 334 that identifies Batches of Source Nodes to update based on a compensation capacity of neighbor nodes of the Source Nodes. Clustering Operation 332 determines the source nodes, identifies the neighbor nodes to the source node, and sequences the neighbor nodes according to a combined coverage capacity clustered by Coverage, Handover Success (HOS) Ratio, and HO Attempts. Neighbor Node Sequencing 336 prioritizes gain in collective coverage. Neighbor Sequencing 336 is used to sequence or sort Neighbor Nodes according to a combined coverage capacity. Net collective coverage ratio, average handover success rate, and total handover attempt ratio are determined. Clustering Operation 332 also prioritizes hotspots to determine a scheduled time-slot having a lowest traffic and to determine an additional coverage backup for the source nodes associated with the prioritized hotspots.

Based on the identified batches of source nodes, and based on the radio node status information, a scheduling operation is performed to choose time-slots for executing an update to a batch of source nodes S426. Referring to FIG. 3, Scheduling Operation 350 determines a schedule for upgrading Source Node clusters that provides a minimal impact on data traffic and connected subscribers. The Smart Scheduler 300 performs Scheduling Operation 350 using AI to calculate a scheduling duration by forecasting traffic volume and a subscriber count for source nodes based on historical time series data. Scheduling Operation 350 prioritizes the traffic and subscriber count for individual clusters so the scheduler is able to rank the time-slots for the one or more batches based on a forecast traffic volume and subscriber count for the source nodes in the one or more batches in order to assign the best time-slot to a particular cluster or batch. The one or more batches are ranked according to a priority based on the hotspot count. Time-slots that are compatible for the one or more batches are filtered based on a batch schedule criteria. The Scheduling Operation 350 of Smart Scheduler 300 then selects a highest priority compatible time-slot having a least number of allocated batches, and assigns the selected highest priority compatible time-slot to a highest ranked batch of the one or more batches. In selecting a batch to assign to the time-slot, Scheduling Operation 350 of Smart Scheduler 300 also performs a scheduling risk assessment to identify the at least one of the one or more batches of source nodes to shut down having a minimal impact on data traffic and connected subscribers based on, for example, performance metrics. Prioritizing of Hotspots 354 is used to determine a scheduled time-slot having a lowest traffic and to provide additional coverage for the prioritized source nodes.

A geographic map is used to perform geographic analysis to visually determine a compensation coverage of the neighbor nodes S440. Referring to FIG. 3, Map Visualization 370 is produced by Clustering Operation 330 and Scheduling Operation 350. Geo Analytics 372 produces geographic maps to determine maximum collective coverage. Geographic map produced by Geo Analytics 372 is checked for a Source Node coverage area to determine the collective coverage capacity of multiple Neighbor Nodes to compensate for a particular Source Node. Geographic map produced by Geo Analytics 372 provides performance statistics and map visualization associated with node device performance, batchwise performance, and overall performance.

The process then terminates S450.

At least one embodiment of the method includes monitoring radio nodes to obtain radio node coverage information and to obtain radio node status information, Based on the radio node coverage information, node clustering is performed to identify one or more batches of source nodes to update based on a compensation capacity of neighbor nodes to the source nodes. Based on the one or more batches of source nodes identified from the node clustering, and on the radio node status information, a scheduling operation is performed to choose a time-slot for executing an update to at least one of the one or more batches of source nodes.

Figure 5:
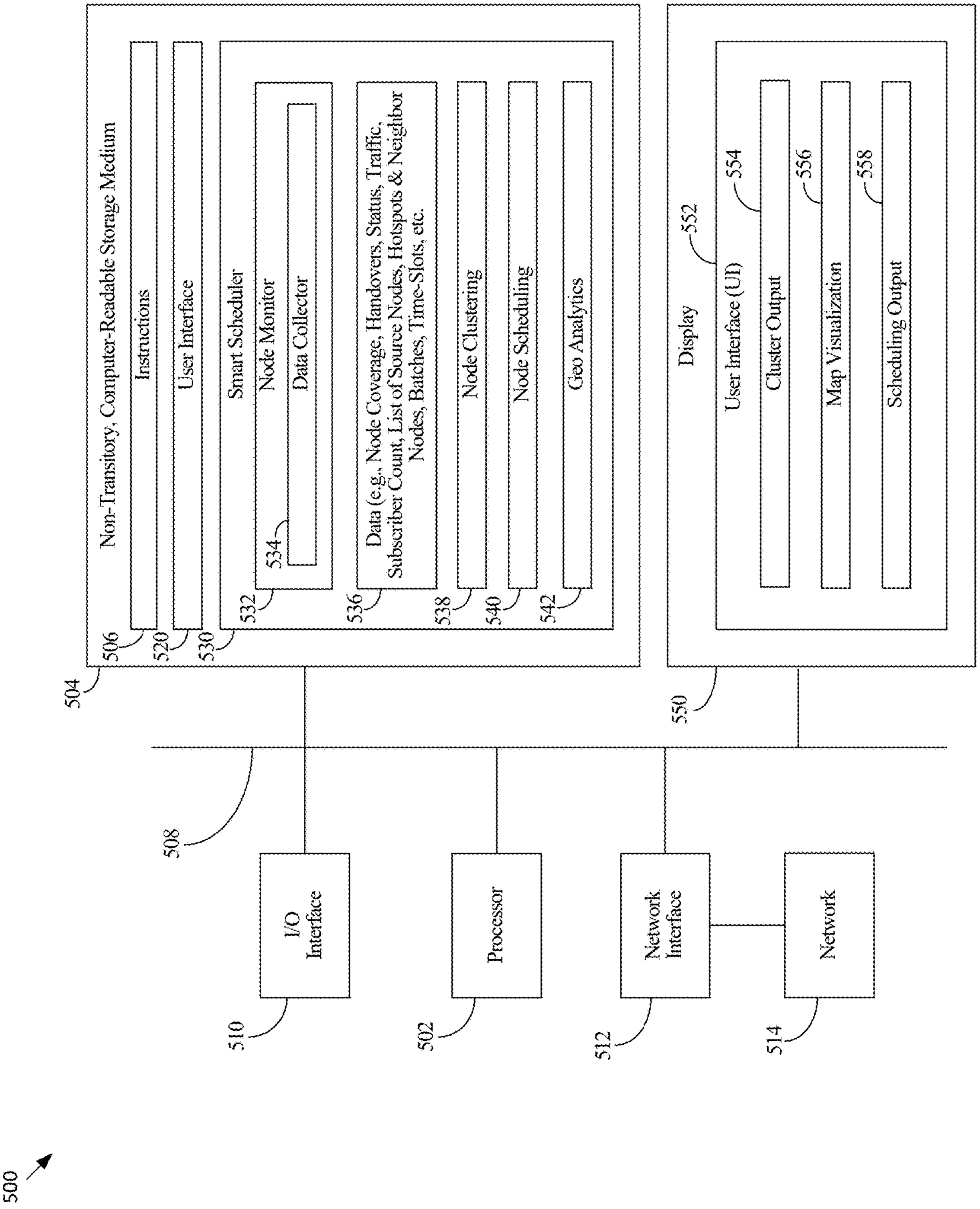
FIG. 5 is a high-level functional block diagram of a processor-based system according to at least one embodiment.

FIG. 5 is a high-level functional block diagram of a processor-based system 500 according to at least one embodiment.

In at least one embodiment, processing circuitry 500 provides smart scheduling to manage software updates to radio nodes in a wireless mobile network. Processing circuitry 500 implements a smart scheduler 530 to manage software updates to radio nodes in a wireless mobile network using Processor 502. Processing circuitry 500 also includes a Non-Transitory, Computer-Readable Storage Medium 504 that is used to implement smart scheduling to manage software updates to radio nodes in a wireless mobile network. Non-Transitory, Computer-Readable Storage Medium 504, amongst other things, is encoded with, i.e., stores, Instructions 506, i.e., computer program code, that are executed by Processor 502 causes Processor 502 to perform operations for providing smart scheduling to manage software updates to radio nodes in a wireless mobile network. Execution of Instructions 506 by Processor 502 represents (at least in part) an application which implements at least a portion of the methods described herein in accordance with one or more embodiments (hereinafter, the noted processes and/or methods).

Processor 502 is electrically coupled to Non-Transitory, Computer-Readable Storage Medium 504 via a Bus 508. Processor 502 is electrically coupled to an Input/Output (I/O) Interface 510 by Bus 508. A Network Interface 512 is also electrically connected to Processor 502 via Bus 508. Network Interface 512 is connected to a Network 514, so that Processor 502 and Non-Transitory, Computer-Readable Storage Medium 504 connect to external elements via Network 514. Processor 502 is configured to execute Instructions 506 encoded in Non-Transitory, Computer-Readable Storage Medium 504 to cause processing circuitry 500 to be usable for performing at least a portion of the processes and/or methods. In one or more embodiments, Processor 502 is a Central Processing Unit (CPU), a multi-processor, a distributed processing system, an Application Specific Integrated Circuit (ASIC), and/or a suitable processing unit.

Processing circuitry 500 includes I/O Interface 510. I/O interface 510 is coupled to external circuitry. In one or more embodiments, I/O Interface 510 includes a keyboard, keypad, mouse, trackball, trackpad, touchscreen, and/or cursor direction keys for communicating information and commands to Processor 502.

Processing circuitry 500 also includes Network Interface 512 coupled to Processor 502. Network Interface 512 allows processing circuitry 500 to communicate with Network 514, to which one or more other computer systems are connected. Network Interface 512 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 500 is configured to receive information through I/O Interface 510. The information received through I/O Interface 510 includes one or more of instructions, data, design rules, libraries of cells, and/or other parameters for processing by Processor 502. The information is transferred to Processor 502 via Bus 508. Processing circuitry 500 is configured to receive information related to a User Interface (UI) through I/O Interface 510. The information is stored in Non-Transitory, Computer-Readable Storage Medium 504 as UI 520.

In one or more embodiments, one or more Non-Transitory, Computer-Readable Storage Medium 504 having stored thereon Instructions 506 (in compressed or uncompressed form) that may be used to program a computer, processor, or other electronic device) to perform processes or methods described herein. The one or more Non-Transitory, Computer-Readable Storage Medium 504 include one or more of an electronic storage medium, a magnetic storage medium, an optical storage medium, a quantum storage medium, or the like.

For example, the Non-Transitory, Computer-Readable Storage Medium 504 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media

504 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 504 stores Instructions 506 configured to cause Processor 502 to perform at least a portion of the processes and/or methods for providing smart scheduling to manage software updates to radio nodes in a wireless mobile network. In one or more embodiments, Non-Transitory, Computer-Readable Storage Medium 504 also stores information, such as algorithm which facilitates performing at least a portion of the processes and/or methods for providing smart scheduling to manage software updates to radio nodes in a wireless mobile network.

Accordingly, in at least one embodiment, Processor 502 executes Instructions 506 stored on the one or more Non-Transitory, Computer-Readable Storage Medium 504 to implement Smart Scheduler 530. Processor 502 implements a Node Monitor 532 of Smart Scheduler 530. Node Monitor 532 monitors radio nodes for radio node coverage information and for radio node status information. Processor 502 implements a Data Collector 534 to collect data based on the monitoring of radio nodes for radio node coverage information and for radio node status information by Node Monitor 532. Data Collector 534 collects coverage information and handover information for the radio nodes based on the radio node coverage information. Data Collector 534 collects transport traffic information and subscriber count information for the radio nodes based on the radio node status information. Processor 502 stores Data 536 that is obtained or generated by Smart Scheduler 530 in Non-Transitory, Computer-Readable Storage Medium 504. Processor 502 implements Node Clustering 538 to process at least part of Data 536, e.g., the radio node coverage information, to identify batches of source nodes to update. Batches of source nodes to update are identified based on a compensation capacity of neighbor nodes of selected source nodes. Node Clustering 538 determines the source nodes, identifies the neighbor nodes to the source nodes, and sequences the neighbor nodes according to a combined coverage capacity clustered by Coverage, Handover Success (HOS) Ratio, and HO Attempts. Node Clustering 538 also prioritizes hotspots to determine a scheduled time-slot having a lowest traffic and determines an additional coverage backup for the source nodes associated with the prioritized hotspots. Processor 502 implements Node Scheduling 540 to choose time-slots for executing an update to a batch of source nodes based on, for example, the identified batches of source nodes, and the radio node status information. Node Scheduling 540 forecasts traffic volume and a subscriber count for the source nodes in the one or more batches, ranks the time-slots for the one or more batches based on a forecast traffic volume and subscriber count for the source nodes in the one or more batches, ranks the one or more batches according to a priority based on a hotspot count, filters the time-slots that are compatible for the one or more batches based on a batch schedule criteria, selects a highest priority compatible time-slot having a least number of allocated batches, and assigns the selected highest priority compatible time-slot to a highest ranked batch of the one or more batches. Node Scheduling 540 also performs a scheduling risk assessment to identify the at least one of the one or more batches of source nodes to shut down having a minimal impact on data traffic and connected subscribers. Processor 502 implements Geo Analytics 542 to generate a geographic map and to perform geographic analysis to visually determine a compensation coverage of the neighbor nodes. Processor 502 presents information to a user via User Interface 552 on Display 550. Processor 502 presents Cluster Output 554 from Node Clustering 538 and Scheduling Output 558 from Node Scheduling 540. Processor 502 presents Map Visualization 556 including simulations of updates performed using determined batches of source nodes.

Embodiments described herein provide a method that provides one or more advantages. For example, Smart Scheduler 530 is able to reduce the impact to network coverage area during updates to source nodes by, for example, utilizing the neighboring nodes, maintaining handover success rates among radio-nodes, e.g., handover success rates close to a pre-schedule period, minimizing a reduction of IP network traffic by shutting down nodes at the optimal time when the throughput is minimum, updating nodes while the least number of users are connected, and ensuring adequate coverage and handover support for the high priority nodes, e.g., nodes that VIPs or many subscribers are connected. Smart Scheduler 530 also automatically takes into consideration issues that impact network service and attempts to make a schedule of automatic software updates that are able to be executed at one time. Smart Scheduler 530 is able to keep the impact to the system and to customers significantly low or manageable. Node network coverage area affected is minimized and the handover success rate among the radio nodes is maintained, the reduction of IP network traffic is minimized by updating nodes while the least number of users are connected.

[1] An aspect of this description is directed to a method that includes monitoring radio nodes to obtain radio node coverage information and to obtain radio node status information, based on the radio node coverage information, performing node clustering to identify one or more batches of source nodes to update based on a compensation capacity of neighbor nodes to the source nodes, and based on the one or more batches of source nodes identified from the node clustering, and on the radio node status information, performing a scheduling operation to choose a time-slot for executing an update to at least one of the one or more batches of source nodes.

[2] The method described in [1], wherein the monitoring the radio nodes to obtain the radio node coverage information includes collecting coverage information and handover information for the radio nodes, and wherein the monitoring the radio nodes to obtain the radio node status information includes collecting transport traffic information and subscriber count information for the radio nodes.

[3] The method described in any of [1] to [2], wherein the performing node clustering to identify one or more batches of source nodes to update based on the compensation capacity of the neighbor nodes to the source nodes includes determining the source nodes, identifying the neighbor nodes to the source node, and sequencing the neighbor nodes according to a combined coverage capacity clustered by Coverage, Handover Success (HOS) Ratio, and HO Attempts.

[4] The method described in any of [1] to [3], wherein the performing the scheduling operation to choose the time-slot for executing an update to the at least one of the one or more batches of source nodes includes forecasting traffic volume and a subscriber count for the source nodes in the one or more batches, ranking time-slots for the one or more batches based on a forecast traffic volume and subscriber count for the source nodes in the one or more batches, ranking the one or more batches according to a priority based on a hotspot count, filtering the time-slots that are compatible for the one or more batches based on a batch schedule criteria, selecting a highest priority compatible time-slot having a least number of allocated batches, and assigning the selected highest priority compatible time-slot to a highest ranked batch of the one or more batches.

[5] The method described any of in [1] to [4], further includes performing geographic analytics to generate a geographic map showing a maximum compensation coverage of the neighbor nodes.

[6] The method described in any of [1] to [5], wherein the performing node clustering includes prioritizing hotspots to determine a scheduled time-slot having a lowest traffic and to determine an additional coverage backup for the source nodes associated with the prioritized hotspots.

[7] The method described in any of [1] to [6], wherein the performing the scheduling operation to choose the time-slot for executing the update to the at least one of the one or more batches of source nodes includes performing a scheduling risk assessment to identify the at least one of the one or more batches of source nodes to shut down having a minimal impact on data traffic and connected subscribers.

[8] An aspect of this description is directed to a smart scheduler configured to monitor radio nodes to obtain radio node coverage information and to obtain radio node status information, based on the radio node coverage information, perform node clustering to identify one or more batches of source nodes to update based on a compensation capacity of neighbor nodes to the source nodes, and based on the one or more batches of source nodes identified from the node clustering, and on the radio node status information, perform a scheduling operation to choose a time-slot for executing an update to at least one of the one or more batches of source nodes.

[9] The smart scheduler described in [8], further configured to monitor the radio nodes to obtain the radio node coverage information by collecting coverage information and handover information for the radio nodes, and wherein the monitoring the radio nodes to obtain the radio node status information includes collecting transport traffic information and subscriber count information for the radio nodes.

[10] The smart scheduler described in any of [8] to [9], further configured to perform the node clustering to identify the one or more batches of source nodes to update based on the compensation capacity of the neighbor nodes to the source nodes by determining the source nodes, identifying the neighbor nodes to the source node, and sequencing the neighbor nodes according to a combined coverage capacity clustered by Coverage, Handover Success (HOS) Ratio, and HO Attempts.

[11] The smart scheduler described in any of [8] to [10], further configured to perform the scheduling operation to choose the time-slot for executing an update to the at least one of the one or more batches of source nodes by forecasting traffic volume and a subscriber count for the source nodes in the one or more batches, ranking time-slots for the one or more batches based on a forecast traffic volume and subscriber count for the source nodes in the one or more batches, ranking the one or more batches according to a priority based on a hotspot count, filtering the time-slots that are compatible for the one or more batches based on a batch schedule criteria, selecting a highest priority compatible time-slot having a least number of allocated batches, and assigning the selected highest priority compatible time-slot to a highest ranked batch of the one or more batches.

[12] The smart scheduler described in any of [8] to [11], further configured to perform geographic analytics to generate a geographic map showing a maximum compensation coverage of the neighbor nodes.

[13] The smart scheduler described in any of [8] to [12], further configured to perform the node clustering to identify the one or more batches of source nodes to update based on the compensation capacity of the neighbor nodes to the source nodes by prioritizing hotspots to determine a scheduled time-slot having a lowest traffic and to determine an additional coverage backup for the source nodes associated with the prioritized hotspots.

[14] The smart scheduler described in any of [8] to [13], further configured to perform the scheduling operation to choose the time-slot for executing the update to the at least one of the one or more batches of source nodes by performing a scheduling risk assessment to identify the at least one of the one or more batches of source nodes to shut down having a minimal impact on data traffic and connected subscribers.

[15] An aspect of this description is directed to a non-transitory computer-readable media having computer-readable instructions stored thereon, which when executed perform operations including monitoring radio nodes to obtain radio node coverage information and to obtain radio node status information, based on the radio node coverage information, performing node clustering to identify one or more batches of source nodes to update based on a compensation capacity of neighbor nodes to the source nodes, and based on the one or more batches of source nodes identified from the node clustering, and on the radio node status information, performing a scheduling operation to choose a time-slot for executing an update to at least one of the one or more batches of source nodes.

[16] The non-transitory computer-readable media described in [15], wherein the monitoring the radio nodes to obtain the radio node coverage information includes collecting coverage information and handover information for the radio nodes, and wherein the monitoring the radio nodes to obtain the radio node status information includes collecting transport traffic information and subscriber count information for the radio nodes.

[17] The non-transitory computer-readable media described in any of to [16], wherein the performing node clustering to identify one or more batches of source nodes to update based on the compensation capacity of the neighbor nodes to the source nodes includes determining the source nodes, identifying the neighbor nodes to the source node, sequencing the neighbor nodes according to a combined coverage capacity clustered by Coverage, Handover Success (HOS) Ratio, and HO Attempts, and prioritizing hotspots to determine a scheduled time-slot having a lowest traffic and to determine an additional coverage backup for the source nodes associated with the prioritized hotspots.

[18] The non-transitory computer-readable media described in any of to [17], wherein the performing the scheduling operation to choose the time-slot for executing an update to the at least one of the one or more batches of source nodes includes forecasting traffic volume and a subscriber count for the source nodes in the one or more batches, ranking time-slots for the one or more batches based on a forecast traffic volume and subscriber count for the source nodes in the one or more batches, ranking the one or more batches according to a priority based on a hotspot count, filtering the time-slots that are compatible for the one or more batches based on a batch schedule criteria, selecting a highest priority compatible time-slot having a least number of allocated batches, and assigning the selected highest priority compatible time-slot to a highest ranked batch of the one or more batches.

[19] The non-transitory computer-readable media described in any of to [18], further comprising performing geographic analytics to generate a geographic map showing a maximum compensation coverage of the neighbor nodes.

[20] The non-transitory computer-readable media described in any of to [19], wherein the performing the scheduling operation to choose the time-slot for executing the update to the at least one of the one or more batches of source nodes includes performing a scheduling risk assessment to identify the at least one of the one or more batches of source nodes to shut down having a minimal impact on data traffic and connected subscribers.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method, comprising:

monitoring radio nodes to obtain radio node coverage information and to obtain radio node status information;

based on the radio node coverage information, performing node clustering to identify one or more batches of source nodes to update based on a compensation capacity of neighbor nodes to the source nodes; and based on the one or more batches of source nodes identified from the node clustering, and on the radio node status information, performing a scheduling operation to choose a time-slot for executing an update to at least one of the one or more batches of source nodes.

2. The method of claim 1, wherein the monitoring the radio nodes to obtain the radio node coverage information includes collecting coverage information and handover information for the radio nodes, and wherein the monitoring the radio nodes to obtain the radio node status information includes collecting transport traffic information and subscriber count information for the radio nodes.

3. The method of claim 1, wherein the performing node clustering to identify one or more batches of source nodes to update based on the compensation capacity of the neighbor nodes to the source nodes includes:

determining the source nodes;

identifying the neighbor nodes to the source node; and sequencing the neighbor nodes according to a combined coverage capacity clustered by Coverage, Handover Success (HOS) Ratio, and HO Attempts.

4. The method of claim 1, wherein the performing the scheduling operation to choose the time-slot for executing an update to the at least one of the one or more batches of source nodes includes:

forecasting traffic volume and a subscriber count for the source nodes in the one or more batches;

ranking time-slots for the one or more batches based on a forecast traffic volume and subscriber count for the source nodes in the one or more batches;

ranking the one or more batches according to a priority based on a hotspot count;

filtering the time-slots that are compatible for the one or more batches based on a batch schedule criteria;

selecting a highest priority compatible time-slot having a least number of allocated batches; and assigning the selected highest priority compatible time-slot to a highest ranked batch of the one or more batches.

5. The method of claim 1 further comprising performing geographic analytics to generate a geographic map showing a maximum compensation coverage of the neighbor nodes.

6. The method of claim 1, wherein the performing node clustering includes prioritizing hotspots to determine a scheduled time-slot having a lowest traffic and to determine an additional coverage backup for the source nodes associated with the prioritized hotspots.

7. The method of claim 1, wherein the performing the scheduling operation to choose the time-slot for executing the update to the at least one of the one or more batches of source nodes includes performing a scheduling risk assessment to identify the at least one of the one or more batches of source nodes to shut down having a minimal impact on data traffic and connected subscribers.

8. A smart scheduler configured to:

monitor radio nodes to obtain radio node coverage information and to obtain radio node status information;

based on the radio node coverage information, perform node clustering to identify one or more batches of source nodes to update based on a compensation capacity of neighbor nodes to the source nodes; and based on the one or more batches of source nodes identified from the node clustering, and on the radio node status information, perform a scheduling operation to choose a time-slot for executing an update to at least one of the one or more batches of source nodes.

9. The smart scheduler of claim 8, further configured to monitor the radio nodes to obtain the radio node coverage information by collecting coverage information and handover information for the radio nodes, and wherein the monitoring the radio nodes to obtain the radio node status information includes collecting transport traffic information and subscriber count information for the radio nodes.

10. The smart scheduler of claim 8, further configured to perform the node clustering to identify the one or more batches of source nodes to update based on the compensation capacity of the neighbor nodes to the source nodes by determining the source nodes, identifying the neighbor nodes to the source node, and sequencing the neighbor nodes according to a combined coverage capacity clustered by Coverage, Handover Success (HOS) Ratio, and HO Attempts.

11. The smart scheduler of claim 8, further configured to perform wherein the performing the scheduling operation to choose the time-slot for executing an update to the at least one of the one or more batches of source nodes by forecasting traffic volume and a subscriber count for the source nodes in the one or more batches, ranking time-slots for the one or more batches based on a forecast traffic volume and subscriber count for the source nodes in the one or more batches, ranking the one or more batches according to a priority based on z hotspot count, filtering the time-slots that are compatible for the one or more batches based on a batch schedule criteria, selecting a highest priority compatible time-slot having a least number of allocated batches, and assigning the selected highest priority compatible time-slot to a highest ranked batch of the one or more batches.

12. The smart scheduler of claim 8, further configured to perform geographic analytics to generate a geographic map showing a maximum compensation coverage of the neighbor nodes.

13. The smart scheduler of claim 8, further configured to perform the node clustering to identify the one or more batches of source nodes to update based on the compensation capacity of the neighbor nodes to the source nodes by prioritizing hotspots to determine a scheduled time-slot having a lowest traffic and to determine an additional coverage backup for the source nodes associated with the prioritized hotspots.

14. The smart scheduler of claim 8, further configured to perform the scheduling operation to choose the time-slot for executing the update to the at least one of the one or more batches of source nodes by performing a scheduling risk assessment to identify the at least one of the one or more batches of source nodes to shut down having a minimal impact on data traffic and connected subscribers.

15. A non-transitory computer-readable media having computer-readable instructions stored thereon, which when executed perform operations comprising:

monitoring radio nodes to obtain radio node coverage information and to obtain radio node status information;

based on the radio node coverage information, performing node clustering to identify one or more batches of source nodes to update based on a compensation capacity of neighbor nodes to the source nodes; and based on the one or more batches of source nodes identified from the node clustering, and on the radio node status information, performing a scheduling operation to choose a time-slot for executing an update to at least one of the one or more batches of source nodes.

16. The non-transitory computer-readable media of claim 15, wherein the monitoring the radio nodes to obtain the radio node coverage information includes collecting coverage information and handover information for the radio nodes, and wherein the monitoring the radio nodes to obtain the radio node status information includes collecting transport traffic information and subscriber count information for the radio nodes.

17. The non-transitory computer-readable media of claim 15, wherein the performing node clustering to identify one or more batches of source nodes to update based on the compensation capacity of the neighbor nodes to the source nodes includes:

determining the source nodes;

identifying the neighbor nodes to the source node;

sequencing the neighbor nodes according to a combined coverage capacity clustered by Coverage, Handover Success (HOS) Ratio, and HO Attempts; and prioritizing hotspots to determine a scheduled time-slot having a lowest traffic and to determine an additional coverage backup for the source nodes associated with the prioritized hotspots.

18. The non-transitory computer-readable media of claim 15, wherein the performing the scheduling operation to choose the time-slot for executing an update to the at least one of the one or more batches of source nodes includes:

forecasting traffic volume and a subscriber count for the source nodes in the one or more batches;

ranking time-slots for the one or more batches based on a forecast traffic volume and subscriber count for the source nodes in the one or more batches;

ranking the one or more batches according to a priority based on hotspot count;

filtering the time-slots that are compatible for the one or more batches based on a batch schedule criteria;

selecting a highest priority compatible time-slot having a least number of allocated batches; and assigning the selected highest priority compatible time-slot to a highest ranked batch of the one or more batches.

19. The non-transitory computer-readable media of claim 15 further comprising performing geographic analytics to generate a geographic map showing a maximum compensation coverage of the neighbor nodes.

20. The non-transitory computer-readable media of claim 15, wherein the performing the scheduling operation to choose the time-slot for executing the update to the at least one of the one or more batches of source nodes includes performing a scheduling risk assessment to identify the at least one of the one or more batches of source nodes to shut down having a minimal impact on data traffic and connected subscribers.

* * * * *